United States Patent
Sarar

(10) Patent No.: US 6,568,518 B2
(45) Date of Patent: May 27, 2003

(54) CLUTCH FOR A POWER TRAIN OF A MOTOR VEHICLE

(75) Inventor: Serdar Serkan Sarar, Oberkirch (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 23 days.

(21) Appl. No.: 09/814,400

(22) Filed: Mar. 22, 2001

(65) Prior Publication Data

US 2001/0025759 A1 Oct. 4, 2001

(30) Foreign Application Priority Data

Mar. 22, 2000 (DE) .......................................... 100 14 230

(51) Int. Cl.⁷ .............................................. F16D 21/02
(52) U.S. Cl. ............... 192/48.8; 192/70.12; 192/113.23
(58) Field of Search ............................ 192/48.8, 70.12, 192/113.23, 113.24, 113.25, 113.26

(56) References Cited

U.S. PATENT DOCUMENTS

| | | | | |
|---|---|---|---|---|
| 1,955,304 A | * | 4/1934 | Libby ..................... | 192/104 C |
| 3,018,864 A | * | 1/1962 | Elfes ...................... | 192/113.26 |
| 3,217,844 A | * | 11/1965 | Nelson et al. ......... | 188/264 AA |
| 3,366,210 A | * | 1/1968 | Webster .................. | 192/113.34 |
| 4,139,085 A | * | 2/1979 | Kanbe et al. ........... | 192/107 C |
| 4,294,343 A | * | 10/1981 | Reh ....................... | 192/113.23 |
| 4,782,931 A | * | 11/1988 | Lederman .............. | 192/113.32 |
| 4,923,043 A | * | 5/1990 | Okuno ................... | 192/113.23 |
| 4,989,697 A | * | 2/1991 | Denton ................... | 188/264 R |
| 5,845,757 A | * | 12/1998 | Csonka ................. | 192/105 BA |

* cited by examiner

Primary Examiner—Christopher P. Schwartz
Assistant Examiner—Xuan Lan Nguyen
(74) Attorney, Agent, or Firm—Darby & Darby

(57) ABSTRACT

A motor vehicle clutch has at least one flywheel (4a) equipped with fan blades (34) at least in a zone that is radially between a hub (54) and a solid ring portion with a friction surface (48). The clutch is configured so that the fan blades of the rotating flywheel will generate an air stream to flow over the surface portion of the flywheel on the opposite side from the friction surface for efficient cooling of the clutch.

10 Claims, 2 Drawing Sheets

CLUTCH FOR A POWER TRAIN OF A MOTOR VEHICLE

BACKGROUND OF THE INVENTION

The invention relates to a clutch, in particular for a power train of a motor vehicle. The clutch has an input shaft supporting a flywheel with a substantially ring-shaped friction surface and an output shaft supporting a clutch disc with a friction lining conforming to the friction surface of the flywheel. The flywheel is constrained to rotate together with the input shaft, and the clutch disc is constrained to rotate with the output shaft. The clutch further has an axially movable pressure plate and an actuator device that serves to move the pressure plate and thereby engage and disengage the clutch. In the engaged position, the pressure plate is urging the clutch disc into friction-locked compressive contact against the flywheel. In the disengaged position, the pressure plate is retracted, whereby the friction-lock between the input shaft and the output shaft is interrupted. The aforementioned components are enclosed in a housing with openings for the input shaft and the output shaft to pass through.

FIG. 5 provides a general orientation of the layout and function of a motor vehicle clutch. An input shaft 2 originating from a source of motive power, e.g., the crankshaft of an engine, carries a flywheel 4 that is constrained on the input shaft to share its rotation. The flywheel 4, which generally performs the function of an engine flywheel, extends as a disc from the input shaft to an outer circumference where its contour turns into the axial direction to form a cylindrical wall, ending in a radially inward bent rim that forms an abutment ring 6. Running axially in line with the input shaft 2 is an output shaft 8. A clutch disc 10 is attached to the output shaft through a rotationally fixed connection. The radially outer portion of the clutch disc 10 carries a substantially ring-shaped friction lining 12 designed to engage a corresponding friction surface of the flywheel 4. The flywheel 4 can likewise be equipped with a friction lining.

The clutch disc 10 is axially movable in relation to the output shaft 8, or flexibly deformable in the axial direction. A pressure disc or pressure plate 14 that is axially movable in relation to the output shaft 8 and can be rotationally constrained to the latter serves to press the clutch disc 10 against the flywheel 4. Normally, a diaphragm spring 16, seated at its outer circumference against the abutment ring 6, pushes the pressure plate 14 against the clutch disc 10, so that the latter is in non-slipping frictional engagement with the flywheel 4. The radially inner border of the diaphragm spring is held in a retracting ring 18 that is rotatably supported on an actuator ring 20. The actuator ring 20 is axially movable on the output shaft 8 by means of an actuator mechanism 22. By moving the actuator ring 20 to the right (as shown in FIG. 5) the diaphragm spring 16 is caused to change its shape so that the pressure plate 14 is no longer pushed against the clutch disc 10 and the clutch is taken out of engagement. The entire arrangement is accommodated in a housing 24 that is formed by a so-called clutch bell 26 and the engine housing 28. The clutch bell 26, covering the side of the clutch facing towards the transmission, is attached to the engine housing 28.

Mechanical clutches of this kind, which include one or more flywheels, have to meet exacting requirements. The clutch is expected to engage softly, to transmit large amounts of torque, and to have a long operational life span. If the clutch is used in conjunction with automated shift transmissions, in particular with transmissions that shift under load, where several gear shifts can occur in rapid succession under a high torque load, large amounts of heat may be generated in the clutch, which can be detrimental to its functionality and shorten its useful life.

OBJECT OF THE INVENTION

It is therefore the object of the present invention to further develop a clutch of the kind described above in order to increase the rate at which the clutch can convert mechanical energy into thermal energy without suffering damage.

SUMMARY OF THE INVENTION

According to the invention, the foregoing objective is met by a clutch in which the flywheel has fan blades arranged at least in a zone that is radially inside the friction surface, so that the rotation of the flywheel will cause an air stream to flow over the side of the flywheel that faces away from the friction surface.

In a clutch designed in accordance with the invention, the air stream will carry the heat away significantly faster, so that even at a high rate of heat generation, the friction linings will remain at a low temperature and will therefore not be exposed to the risk of being damaged.

In a preferred embodiment of the invention, the flywheel, the clutch disc and the pressure plate have air passages located in a radial zone between the output shaft and the friction lining. This allows the air stream generated by the fan blades of the flywheel to flow axially along the output shaft.

Also preferred according to the invention is a configuration of the clutch where the housing surrounds the flywheel, the clutch disc and the pressure plate at a sufficient distance for the air to circulate in a closed loop. Passing through the aforementioned air passages in the flywheel, the clutch disc and the pressure plate, the air will move in an axial direction along the output shaft from the pressure plate to the flywheel, then turn radially outwards and continue its circulation path between the housing and the flywheel, then turn into the axial direction along the peripheral housing wall from the flywheel to the pressure plate, and finally turn back inwards in the radial direction to complete the loop of air circulation.

In another preferred embodiment of the invention, the housing has an air inlet and an air outlet. In this case, outside air enters the housing through the inlet, then flows on a path inside the housing that leads through the flywheel, and leaves the housing through the air outlet.

In the embodiment of the preceding paragraph, a preferred location for the air inlet is on the side of the housing that is farther away from the flywheel, while the air outlet is located preferably in a peripheral housing wall, so that the air flow path runs in an axial direction from the air inlet along the output shaft, passes through the flywheel, then turns into an outward radial direction between the housing and the flywheel and exits from the housing through the air outlet.

In a clutch according to the invention, it is advantageous if the housing has an interior surface that is provided with cooling fins.

In clutches according to the invention, it is preferred if the flywheel performs the function of an engine flywheel.

In preferred embodiments of the invention, it is of advantage if the flywheel is provided with cooling fins.

As a further advantageous concept within the scope of the invention, a clutch may have two or more flywheels, clutch discs and pressure plates arranged in an alternating line-up along the rotational axis of the clutch.

In an advantageous practical embodiment of the foregoing concept, the clutch has one input shaft and two output shafts. The first output shaft runs coaxially inside the hollow second output shaft. The aforementioned alternating line-up, starting from the side of the input shaft, includes:

- a first flywheel rotationally fixed on the input shaft;
- a first clutch disc rotationally fixed on the first output shaft;
- a first pressure plate operable by means of an actuator mechanism to actuate the first clutch disc;
- a second flywheel rotationally fixed on the input shaft;
- a second clutch disc rotationally fixed on the second output shaft; and
- a second pressure plate operable by means of the actuator mechanism to actuate the second clutch disc.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, examples of embodiments of the invention are discussed on the basis of the attached drawing in which.

DETAILED DESCRIPTION OF PREFERRED EMBODIMENTS

Figure 1:
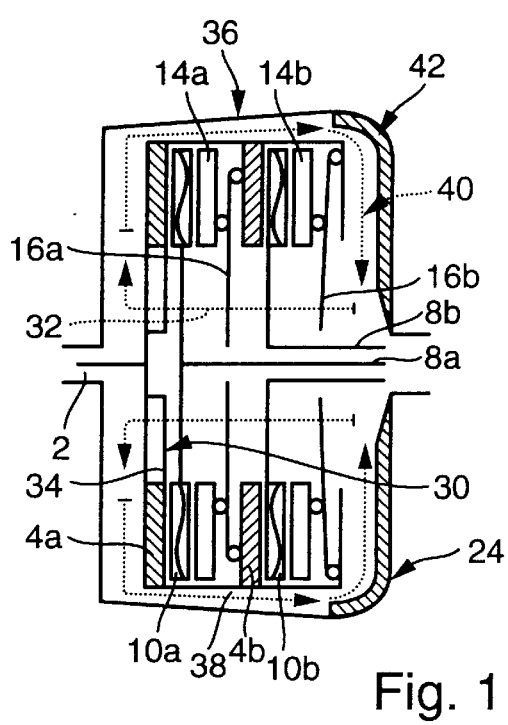
FIG. 1 represents a cross-sectional view of a first embodiment of the clutch according to the invention.
Figure 2:
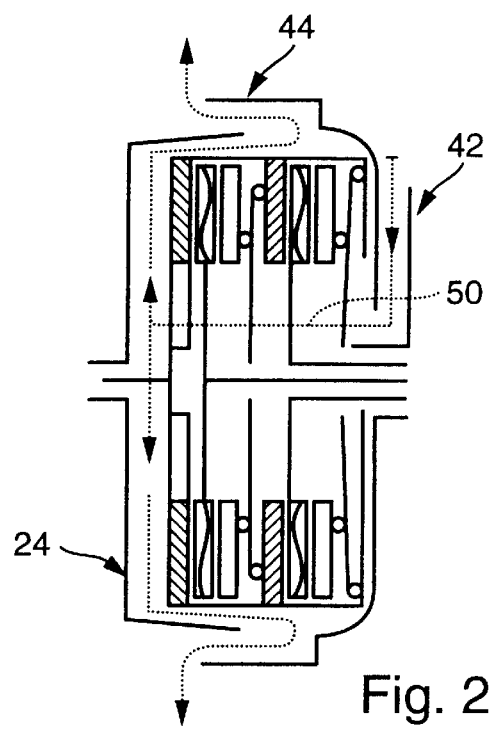
FIG. 2 represents a cross-sectional view of a second embodiment of the clutch according to the invention.
Figure 5:
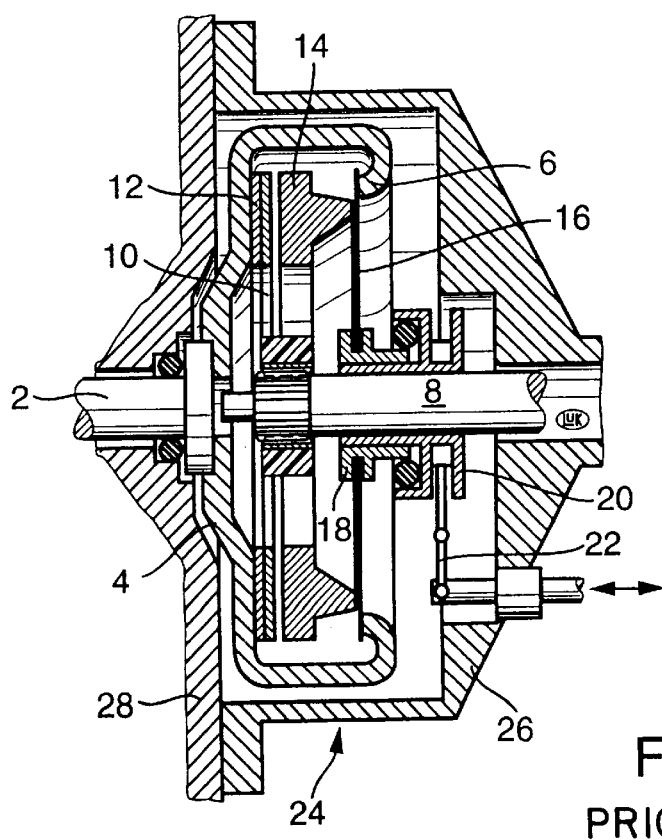
FIG. 5 represents a cross-sectional view of a motor vehicle clutch.

Unlike the clutch of FIG. 5 that was discussed at the beginning, the clutches that are schematically represented in FIGS. 1 and 2 have two flywheels, 4a and 4b respectively, mounted on the input shaft 2 through a rotationally locked connection. Flywheel 4a cooperates with clutch disc 10a, pressure plate 14a, and diaphragm spring 16a; while flywheel 4b cooperates with clutch disc 10b, pressure plate 14b, and diaphragm spring 16b. The diaphragm springs 4a, 4b normally push the pressure plates 14a, 14b against the clutch discs 10a, 10b, so that the latter are pressed into frictional engagement against the respective flywheels 4a, 4b.

The clutch disc 10a is mounted through a rotationally locked connection to an output shaft 8a, while the clutch disc 10b is mounted through a rotationally locked connection to an output shaft 8b. The two shafts run coaxially, i.e., output shaft 8b is hollow, and output shaft 8a extends partially inside output shaft 8b. Clutches of this type are used, for example, with so-called power-shift transmissions, i.e., transmissions that can be shifted while transmitting a torque between the engine and the drive train, where the input shaft 2 is coupled simultaneously or selectively to the output shafts 8a and 8b. The actuator mechanism for actuating the diaphragm springs 16a, 16b is not shown in detail, but its principal configuration is analogous to FIG. 5.

When the transmission is shifted while transmitting torque and also when setting the vehicle in motion from a stand-still condition, a large amount of heat is generated between the clutch discs and the flywheels. Since the heat is not carried away efficiently by the housing 24, the resultant increase in temperature is known to cause problems.

To improve the removal of heat, all of the radially oriented elements of the clutch, i.e., the flywheels, clutch discs, pressure plates and diaphragm springs are provided with passages 30 (not shown in detail) in the zone between the outside of the shafts and the inner radius of the friction linings, so that an air-flow path 32 is cleared next to the output shafts 8a and 8b. The flywheel 4a is equipped with fan blades 34 and thus functions as a fan that moves air from right to left (in FIG. 1) through the flywheel 4a. The fan blades could also be pitched in the opposite sense, so that the air would flow from left to right, i.e., from the flywheel to the bell cover.

Between the housing 24 and the left-facing surface (in FIG. 1) of the fly-wheel 4a, there is a gap in which the air can flow radially outwards. The air-flow path continues left to right through the gap between the peripheral wall 36 of the housing 24 and a cylindrical wall 38 that surrounds the clutch parts and connects the flywheels 4a and 4b. The air flow continues radially inwards on path 40 along the right-hand end surface of the housing. Thus, the air circulates in a closed loop around the flywheel 4a and the cylindrical wall 38 and thereby effectively cools the flywheels 4a and 4b. As an effective means for transferring the heat from the circulating air stream to the outside, the interior surface of the housing is provided with cooling fins that are advantageously arranged in those areas where the exterior surface of the housing is exposed to the outside air.

It should be clear that the left-facing side of the flywheel 4a (in FIG. 1) can also have cooling fins in the surface area opposite the ring-shaped friction surface. The cooling fins on the flywheel 4a can perform the additional function of a radial fan to assist in moving the air stream in the outward radial direction.

FIG. 2 illustrates a variant version of the clutch according to the invention. Reference symbols are shown only for those elements that differ from the embodiment of FIG. 1. In contrast to the substantially closed housing of FIG. 1, the housing 24 of the embodiment of FIG. 2 has an inlet opening 42 in the area of the right-facing end surface and a ring-shaped outlet opening 44 along its outside circumference. Of course, the inlet opening 42, also, can be substantially ring-shaped.

As is immediately evident from FIG. 2, the concept of an inlet 42 and outlet 44 leads to an air-flow path 50 that does not run in a closed loop. Instead, the air enters through the inlet 42, flows leftward along the shafts and passes through the flywheel 4a, from where it is directed in the outward radial direction and expelled to the outside through the outlet 44. The embodiment shown in FIG. 2 provides an especially effective cooling of the clutch.

Figure 3:
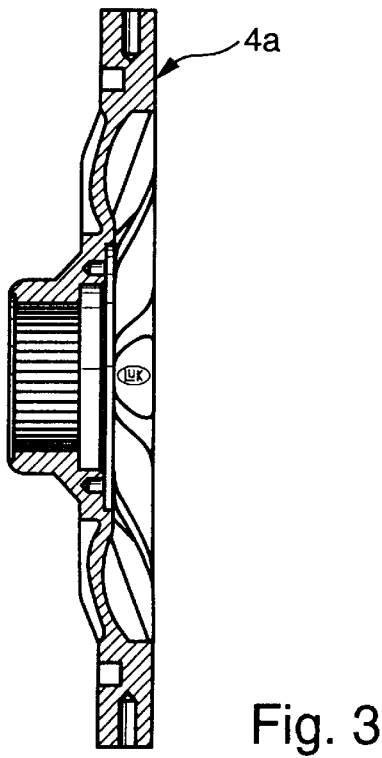
FIG. 3 represents a cross-sectional view of a flywheel.
Figure 4:
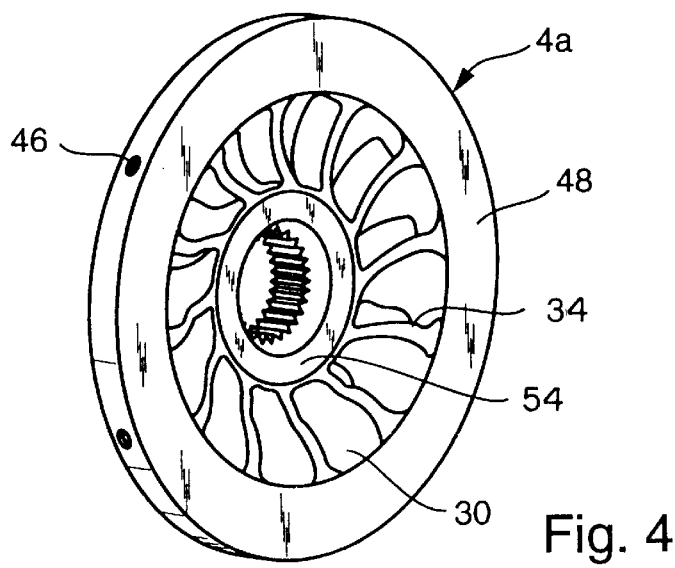
FIG. 4 represents a perspective view of the flywheel.

The flywheel 4a is shown in cross-section in FIG. 3 and in a perspective view in FIG. 4, omitting the outer cylindrical wall 38 that connects the flywheel 4a with the flywheel 4b and ends in a radially inward bent rim that forms an abutment ring 6 (FIG. 5) for the diaphragm spring 16b (FIG. 1). The cylindrical wall 38 can, for example, be bolted to the flywheel 4a, which has fastening holes 46 provided for this purpose on the circumference of the flywheel 4a. As illustrated, the flywheel portion that comes into contact with the clutch disc 10a is configured as a solid ring that carries a friction surface 48 and is joined to a hub 54 by way of the turbine blades 34. The hub 54 has an internal tooth profile for a rotationally fixed connection of the flywheel 4a to the input shaft 2. The turbine blades 34 are shaped so that the flywheel 4a functions as an axial fan which, when the engine crankshaft is running, propels air from right to left (in the illustrated situation) through the openings 30 between the turbine blades 34.

The invention discussed herein on the basis of the illustrated examples can be modified in a multitude of ways. It is not necessary for the clutch to be of a design with two output shafts. The clutch can be configured as shown in FIG. 5, or it can be of a multiple-disc design where a plurality of flywheels and clutch discs are arranged to transmit torque between the input shaft and the output shaft. For extreme heavy-duty requirements, the embodiment of FIG. 2 in particular may be supplemented by an electric fan to assist in propelling the air stream, e.g., as a temperature dependent function. It would also be possible to design both flywheels as axial fans.

To summarize, a clutch of a kind used particularly in the power train of a motor vehicle has an input shaft 2 carrying one or more flywheels 4a, 4b constrained to rotate together with the input shaft 2. The clutch further has one or more output shafts 8a, 8b carrying clutch discs 10a, 10b constrained to rotate together with the output shafts 8a, 8b, respectively. The one or more flywheels 4a, 4b have substantially ring-shaped friction surfaces facing towards corresponding friction linings of the one or more clutch discs 10a, 10b. One or more pressure plates 14a, 14b are axially movable between an engaged and a disengaged position by means of an actuator device 18, 20, 22. In the engaged position, the pressure plate 14a, 14b pushes the respective clutch disc 10a, 10b into friction-locked contact against the respective flywheel 4a, 4b, while in the disengaged position, the pressure plate 14a, 14b is retracted and the friction lock between the respective clutch disc and flywheel is interrupted. The clutch further has a housing 24 in which the aforementioned parts are accommodated, with openings for the input shaft and the output shaft(s) to pass through. To provide improved cooling of the clutch, at least one flywheel (4a, 4b) is configured with fan blades 34 at least in a zone that is radially inside the friction surface, so that the rotation of the flywheel will generate an air stream to flow over the surface portion of the flywheel on the opposite side from the friction surface.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle clutch, comprising:
    an input shaft on which a flywheel with a substantially ring-shaped friction surface is mounted through a rotationally fixed connection;
    an output shaft, on which a clutch disc with a friction lining conforming to and facing said friction surface is mounted through a rotationally fixed connection;
    an axially movable pressure plate;
    an actuator device that serves to move the pressure plate between an engaged position in which the pressure plate is urging the clutch disc into friction-locked compressive contact against the flywheel and a disengaged position in which the pressure plate is retracted and the friction-locked compressive contact is interrupted; and
    a housing with openings for the input shaft and the output shaft to pass through;
    wherein fan blades are integrally formed in the flywheel, said fan blades being arranged at least adjacent to an inner radius of the friction surface and substantially axially abreast with the friction surface, so that the rotation of the flywheel will cause a radially outward-directed air stream to flow on the side of the flywheel that faces away from the friction surface.

2. The clutch of claim 1, wherein the flywheel, the clutch disc and the pressure plate in a radial zone between the output shaft and the inner radius of the friction surface are equipped with air passages allowing the air stream to flow axially along the output shaft.

3. The clutch of claim 2, wherein the housing surrounds the flywheel, the clutch disc and the pressure plate in an arrangement that provides a closed-loop circulation path for the air stream, said path running in an axial direction along the output shaft from the pressure plate to the flywheel, then turning radially outwards and continuing in a radial direction between the housing and the flywheel, then turning into and continuing in an axial direction along a peripheral housing wall from the flywheel to the pressure plate, then turning into and continuing in an inward radial direction to complete the closed-loop circulation path.

4. The clutch of claim 2, wherein the housing has an air inlet and an air outlet, and an air flow path leads through the housing, said air flow path running from the air inlet through the flywheel to the air outlet.

5. The clutch of claim 4, wherein the air inlet is located on the side of the housing that is farther away from the flywheel and the air outlet is located in a peripheral housing wall, so that the air flow path runs in an axial direction from the air inlet along the output shaft, passes through the flywheel, then turns into and continues in an outward radial direction between the housing and the flywheel to the air outlet.

6. The clutch of claim 1, wherein the housing has an interior surface that is provided with cooling fins.

7. The clutch of claim 1, wherein the flywheel performs the function of an engine flywheel.

8. The clutch of claim 1, wherein the flywheel is provided with cooling fins.

9. The clutch of claim 1, wherein the flywheel, the clutch disc and the pressure plate form a first functional group, and wherein the clutch comprises at least one further functional group having a further flywheel, a further clutch disc and a further pressure plate, said first functional group and the at least one further functional group being arranged in an axially stacked sequence of functional groups.

10. The clutch of claim 9, wherein the at least one further functional group is a second functional group comprising a second output shaft, the further flywheel is a second flywheel, the further clutch disc is a second clutch disc, and the further pressure plate is a second pressure plate, wherein the second output shaft is hollow and the output shaft runs coaxially inside the second output shaft, wherein the second flywheel is rotationally fixed on the input shaft, the second clutch disc is rotationally fixed on the second output shaft; and the second pressure plate is operable by means of the actuator mechanism to actuate the second clutch disc.

\* \* \* \* \*